United States Patent
Tao

(10) Patent No.: US 6,809,690 B2
(45) Date of Patent: Oct. 26, 2004

(54) NOTEBOOK COMPUTER WITH AN EMBEDDED ANTENNA

(75) Inventor: Wen-Szu Tao, Taipei Hsien (TW)

(73) Assignee: Wistron NeWeb Corporation, Hsi-Chih (TW)

( * ) Notice: Subject to any disclaimer, the term of this patent is extended or adjusted under 35 U.S.C. 154(b) by 347 days.

(21) Appl. No.: 10/063,200

(22) Filed: Mar. 28, 2002

(65) Prior Publication Data

US 2003/0090469 A1 May 15, 2003

(30) Foreign Application Priority Data

Nov. 15, 2001 (TW) ...................................... 90219716 U

(51) Int. Cl.[7] .............................................. H01Q 13/10
(52) U.S. Cl. ...................................... 343/702; 343/767
(58) Field of Search ......................... 343/702, 700 MS, 343/767, 725, 770, 729, 727, 730, 803, 834, 845

(56) References Cited

U.S. PATENT DOCUMENTS

| | | | | |
|---|---|---|---|---|
| 5,915,020 A | * | 6/1999 | Tilford et al. .............. | 455/3.02 |
| 6,285,328 B1 | * | 9/2001 | Masaki et al. .............. | 343/702 |
| 6,339,400 B1 | * | 1/2002 | Flint et al. ................... | 343/702 |
| 6,456,247 B1 | * | 9/2002 | Hulick et al. ............... | 343/702 |
| 6,456,499 B1 | * | 9/2002 | Nakajima et al. ........... | 361/752 |
| 6,509,877 B2 | * | 1/2003 | Masaki ........................ | 343/702 |
| 6,636,181 B2 | * | 10/2003 | Asano et al. ............... | 343/702 |

FOREIGN PATENT DOCUMENTS

EP        0 701296 A1    3/1996

* cited by examiner

*Primary Examiner*—Don Wong
*Assistant Examiner*—Chuc Tran
(74) *Attorney, Agent, or Firm*—Winston Hsu

(57) ABSTRACT

A notebook includes a main body and a display device. The main body has a housing, a memory, and a processor. The display device has a display panel, a frame, a bracket, and an antenna. The frame is installed outside the display panel. The bracket is installed between the display panel and the frame for strengthening the display device and is monolithically formed with the antenna. The antenna is installed between the display panel and the frame for transmitting or receiving radio frequency signals.

13 Claims, 3 Drawing Sheets

NOTEBOOK COMPUTER WITH AN EMBEDDED ANTENNA

BACKGROUND OF INVENTION

1. Field of the Invention

The present invention relates to a notebook computer, and more particularly, to a notebook computer with an embedded antenna.

2. Description of the Prior Art

Notebook computers are very popular devices in modern society. Notebook computers have light volume and weight, so users can easily carry a notebook computer to work on documents any time. As wireless transmission technology develops, notebook computers no longer have to connect with a wired network to use network functions. Instead, notebook computers only need an antenna so as to wirelessly transmit or receive signals through the antenna.

Please refer to FIG. 1. FIG. 1 is a perspective view of a prior art notebook computer 10. The notebook computer 10 comprises a housing 12 and a display device 14. The display device 14 is rotatably installed on the housing 12. The display device 14 comprises a frame 16 and a display panel 18 installed on the frame 16. An antenna 20 is installed on the frame 16 for receiving or transmitting radio frequency signals. Therefore, the notebook computer 10 can use wireless transmission to transmit or receive data at any time.

However, the antenna 20 of the notebook computer 10 is installed outside the display device 14. The antenna 20 takes up a great amount of space and is easily damaged. Therefore, installing the antenna 20 outside of the notebook computer 10 is not a practical design choice.

SUMMARY OF INVENTION

It is therefore a primary objective of the claimed invention to provide a notebook computer with an embedded antenna.

The claimed invention, briefly summarized, discloses a notebook computer. The notebook computer comprises a main body and a display device. The main body comprises a housing, a memory and a processor. The display device has a display panel, a frame, a bracket, and an antenna. The frame is installed outside the display panel. The bracket is installed between the display panel and the frame for supporting the display device and is monolithically formed with the antenna. The antenna is installed between the display panel and the frame for transmitting or receiving radio frequency signals.

It is an advantage of the claimed invention that the antenna of the claimed invention is monolithically formed with the bracket. This structure can effectively use the space inside the display device, and the antenna will not be easily damaged. In addition, the antenna has two bent horizontal edges that can reduce the width of the antenna. Therefore, although a width between the display panel and the frame is small, the antenna can still be installed with the bracket inside the display device.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
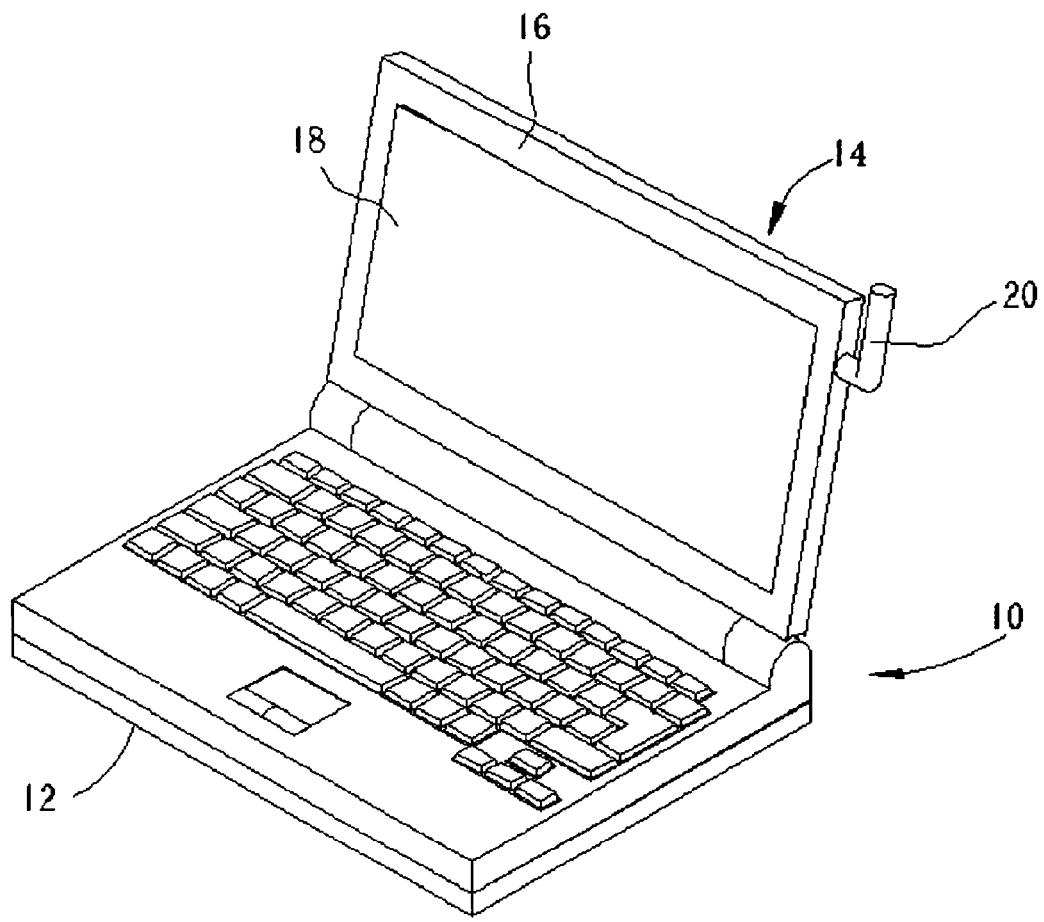
FIG. 1 is a perspective view of a prior art notebook computer.
Figure 2:
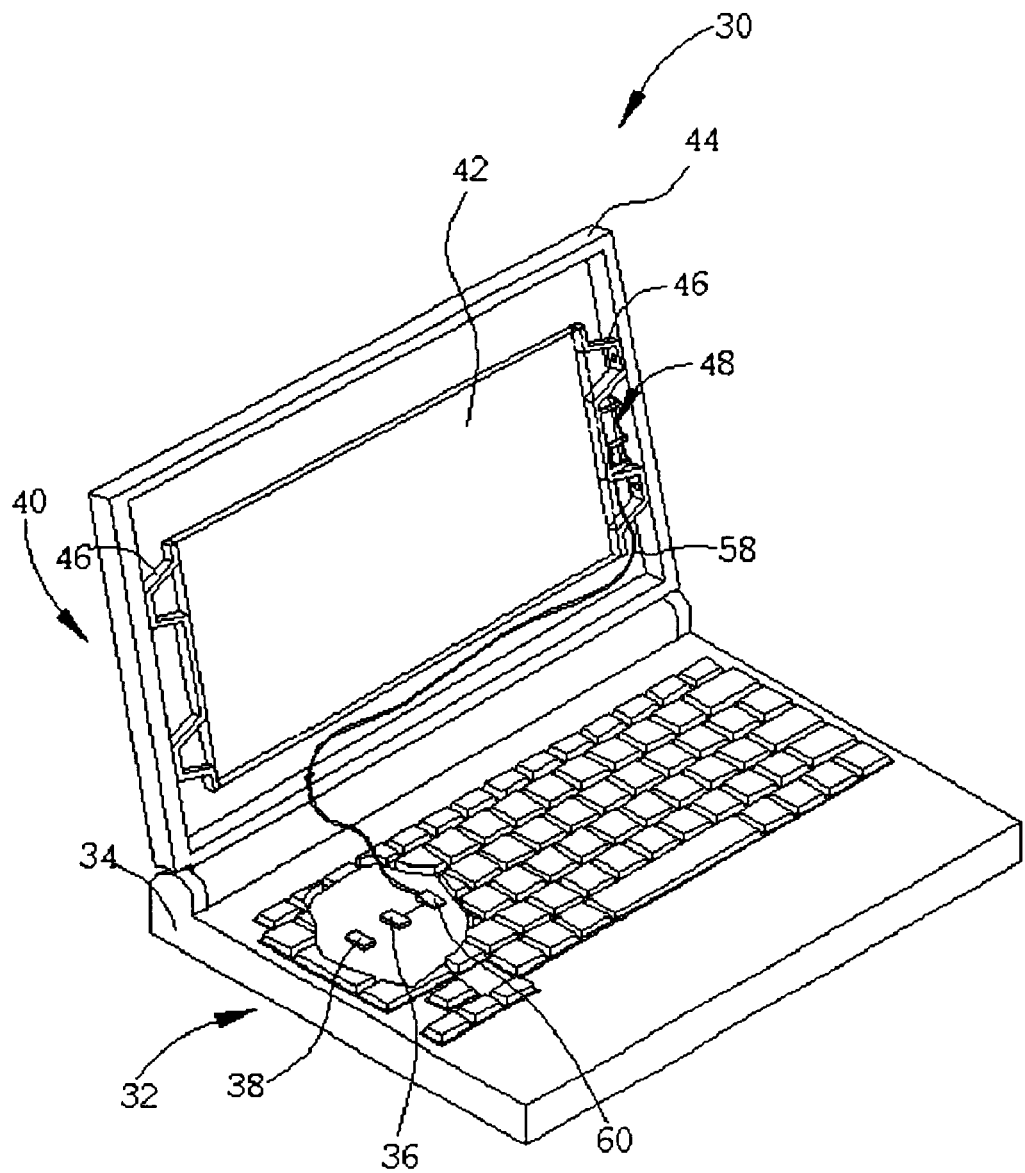
FIG. 2 is a perspective view of the present invention notebook computer.

Please refer to FIG. 2. FIG. 2 is a perspective view of the present invention notebook computer 30. The notebook computer 30 comprises a main body 32 and a display device 40. The main body 32 comprises a housing 34, a memory 38, and a processor 36. The memory 38 is installed inside the housing 34 for storing programs and data. The processor 36 is electrically connected to the memory 38 for processing programs and data stored in the memory 38. The display device 40 is rotatably connected to the housing 34. The display device 40 comprises a display panel 42, a frame 44, a metallic bracket 46, and a slot type antenna 48. The display panel 42 is used to display images. The frame 44 is installed around edges of the display panel 42 for fixing the display panel 42. The bracket 46 is installed between the display panel 42 and the frame 44 for strengthening a structure of the display device 40, so that the display device 40 will not be damaged when the display device 40 is moved. The slot type antenna 48 is monolithically formed with the bracket 46 and installed between the display panel 42 and the frame 44 for transmitting or receiving electromagnetic waves which carry radio frequency (RF) signals.

Figure 3:
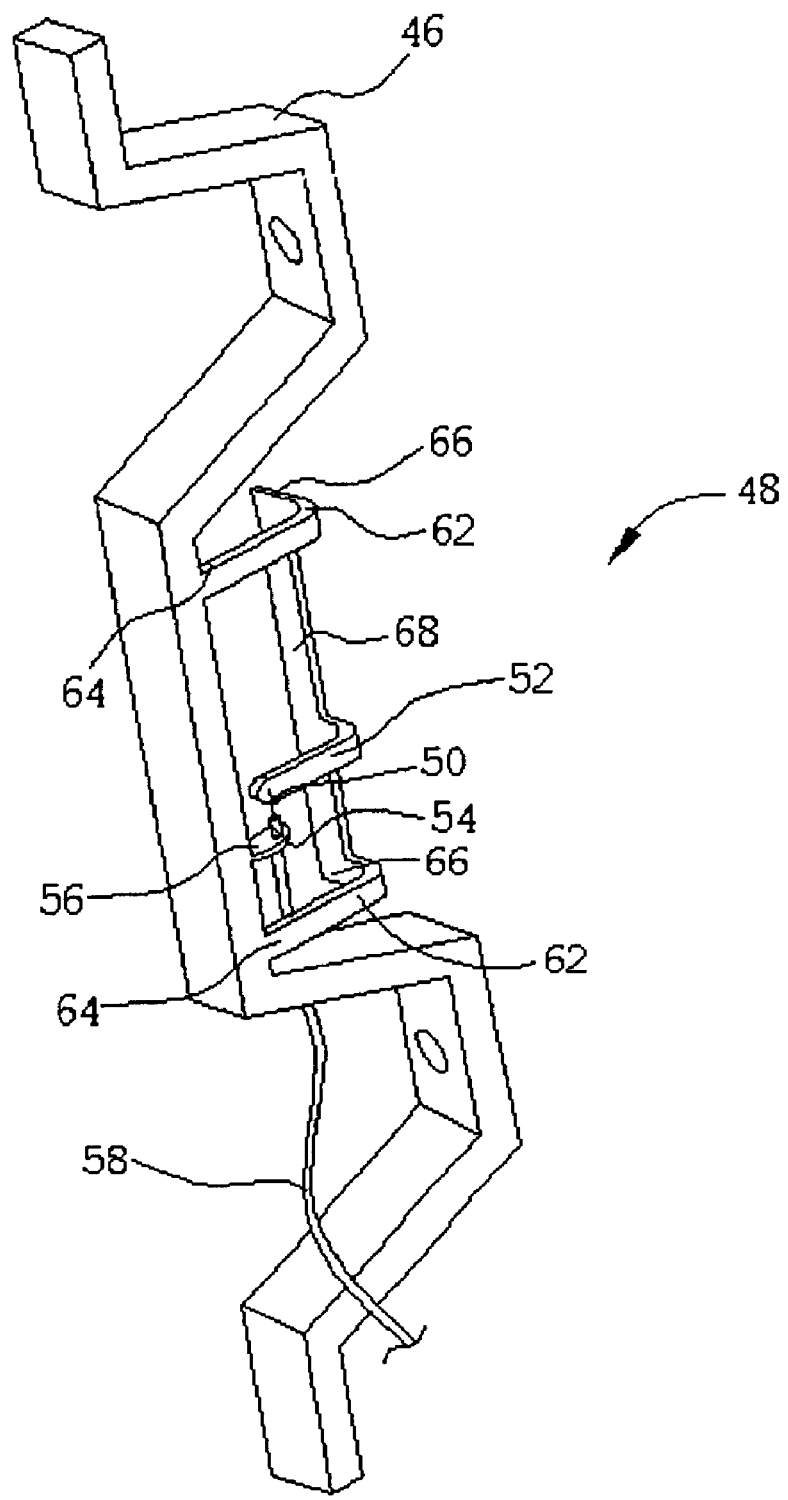
FIG. 3 is a perspective view of the bracket and the slot type antenna shown in FIG. 2.

Please refer to FIG. 3 with reference to FIG. 2. FIG. 3 is a perspective view of the bracket 46 and the slot type antenna 48 shown in FIG. 2. The slot type antenna 48 is monolithically formed with the bracket 46. The slot type antenna 48 comprises a feed end 50 and a ground end 54. The feed end 50 is installed on a cantilever 52 of the slot type antenna 48 for feeding radio frequency signals. The ground end 54 is installed under the feed end 50 and connected to a protrusion 56 of the bracket 46 so as to make the bracket 46 a ground plane of the slot type antenna 48.

The notebook computer 30 further comprises a feed wire 58 and a signal conversion module 60. The feed wire 58 is electrically connected between the feed end 50 of the slot type antenna 48 and the signal conversion module 60. The feed wire 58 is used to transmit radio frequency signals. The signal conversion module 60 is electrically connected to the processor 36 of the notebook computer 30. The signal conversion module 60 is used to convert the radio frequency signals received by the slot type antenna 48 into digital signals, and then transmit the converted digital signals to the processor 36 for further processing. The signal conversion module 60 can be also used to convert the digital signals transmitted by the processor 36 into radio frequency signals, with the converted radio frequency signals then transmitted out through the slot type antenna 48.

The slot type antenna 48 further comprises two bent horizontal edges 62 formed at upper and lower sides of a slot of the slot type antenna 48. Each bent horizontal edge 62 of the slot type antenna 48 has a right angle and each bent horizontal edge 62 comprises a first end 64 and a second end 66. The first ends 64 are connected to the bracket 46, and the second ends 66 are connected to a vertical edge 68 of the slot type antenna 48. The bent horizontal edges 62 make a width of the slot type antenna 48 become smaller. Therefore, although a space between the display panel 42 and the frame 44 inside the display device 40 is very small, the slot type antenna 48 can be installed with the bracket inside the display device 40. When the display device 40 is opened, the slot type antenna 48 can generate horizontal polarization characteristics and form an omni-directional radiation pattern on a horizontal plane, which is consistent with normal antenna design.

The embodiment mentioned above is an example showing the metallic bracket monolithically formed with the slot type antenna. However, other types of antennas are also suitable for the present invention, such as an inverted F type antenna, or other monopole or dipole antennas.

In contrast to the prior art notebook computer 10, the present invention notebook computer 30 has an embedded antenna 48. The antenna 48 is monolithically formed with the bracket 44 and installed between the display panel 42 and the frame 44 in the display device 40. Therefore, the present invention can effectively use the space inside the display device 40. The antenna 48 can also use the bracket to be the ground plane so as to match impedance of the antenna 48. In addition, the antenna 48 has two bent horizontal edges. Therefore, although the width between the display panel 42 and the frame 44 is small, the antenna can also be installed with the bracket 46 inside the display device 40.

The embodiment mentioned above uses the notebook computer 30 as an example. However, the present invention is not limited to the notebook computer 30. The antenna of the present invention is monolithically formed with the bracket. Therefore, the present invention can effectively use the space inside the display device. The design of the present invention is suitable to be used in the rotatably flat LCD of the notebook computer. However, as long as an electronic product has an LCD function and a supporting metallic bracket, then it can use the present invention technology. An example of another device that could use the present invention is a wed pad. The main difference between the notebook computer 30 and the wed pad is that the main body 32 and the display device 40 of the notebook computer 30 are two separate parts, whereas the wed pad only has a main housing. The main housing comprises a processor, an LCD panel, and a metallic bracket that is used to support the LCD panel. Therefore, the antenna can be monolithically formed with the metallic bracket so that the wed pad can use the antenna to transmit and receive signals. As communication technology develops, more types of wireless communication products with flat LCD panels will appear in the future. Because of the space saving advantages of the antenna of the present invention, it is suitable for future wireless communication products.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A notebook computer comprising:
    a main body comprising:
        a housing;
        a memory installed inside the housing for storing programs and data; and
        a processor electrically connected to the memory for processing programs and data; and
        a display device rotatably connected to the housing, the display device comprising:
            a display panel for displaying images;
            a frame installed around edges of the display panel;
            a bracket installed between the display panel and the frame for strengthening a structure of the display device; and
            an antenna monolithically formed with the bracket and installed between the display panel and the frame for transmitting or receiving radio frequency (RF) signals.

2. The notebook computer of claim 1 wherein the antenna comprises a feed end for feeding RF signals and a ground end connected to the bracket.

3. The notebook computer of claim 1 further comprising:
    a signal conversion module electrically connected to the processor for converting RF signals into digital signals and converting digital signals into RF signals; and
    a feed wire electrically connecting the antenna and the signal conversion module for transmitting RF signals.

4. The notebook computer of claim 1 wherein the antenna is a slot type antenna.

5. The notebook computer of claim 1 wherein the antenna is an inverted F antenna.

6. The notebook computer of claim 1 wherein the antenna is a monopole antenna.

7. A notebook computer comprising:
    a main body comprising:
        a housing;
        a memory installed inside the housing for storing programs and data; and
        a processor electrically connected to the memory for processing programs and data; and
        a display device rotatably connected to the housing, the display device comprising:
            a display panel for displaying images;
            a frame installed around edges of the display panel;
            a bracket installed between the display panel and the frame for strengthening a structure of the display device; and
            a slot type antenna monolithically formed with the bracket and installed between the display panel and the frame for transmitting or receiving radio frequency (RF) signals, the antenna having two bent horizontal edges formed at upper and lower sides of a slot of the antenna, each horizontal edge having an end connected to the bracket and another end connected to a vertical edge of the antenna.

8. The notebook computer of claim 7 wherein the antenna further comprises a feed end for feeding RF signals and a ground end connected to the bracket for matching impedance of the antenna.

9. The notebook computer of claim 7 further comprising:
    a signal conversion module electrically connected to the processor for converting RF signals into digital signals and converting digital signals into RF signals; and
    a feed wire electrically connecting the antenna and the signal conversion module for transmitting RF signals.

10. An information process system with wireless signal transmission capability comprising:
    an information process subsystem comprising:
        a memory for storing programs and data; and
        a processor electrically connected to the memory for processing programs and data; and
    an information display subsystem electrically connected to the information process subsystem comprising:
        a display panel for displaying images;
        a metallic bracket for supporting the display panel on the information process system; and
        a slot type antenna monolithically formed with the bracket for receiving and transmitting radio frequency signals, the antenna having a set of bent edges formed at opposite sides of a slot of the antenna, each bent edge having an end connected to the bracket and another end connected to another edge of the antenna.

11. The information process system of claim 10 wherein each of the bent edges of the antenna has a right angle.

12. The information process system of claim 10 further comprising:
- a signal conversion module electrically connected to the processor for converting RF signals into digital signals and converting digital signals into RF signals; and
- a feed wire electrically connecting the antenna and the signal conversion module for transmitting RF signals.

13. A wireless information process system comprising:
- an antenna for transmitting and receiving electromagnetic wave signals according to a wireless transmission protocol;
- a conversion module for converting electromagnetic wave signals into digital information; and
- a flat display for displaying the digital information of the wireless information process system;
- wherein the flat display is fixed on the information process system using a metallic bracket, the antenna being monolithically formed with the metallic bracket, positioned at one side of the flat display, and hidden in the wireless information process system.

* * * * *